March 19, 1940.   W. E. BOOTH   2,194,351
SAFETY DEVICE FOR DISTILLATION APPARATUS AND THE LIKE
Filed March 4, 1937
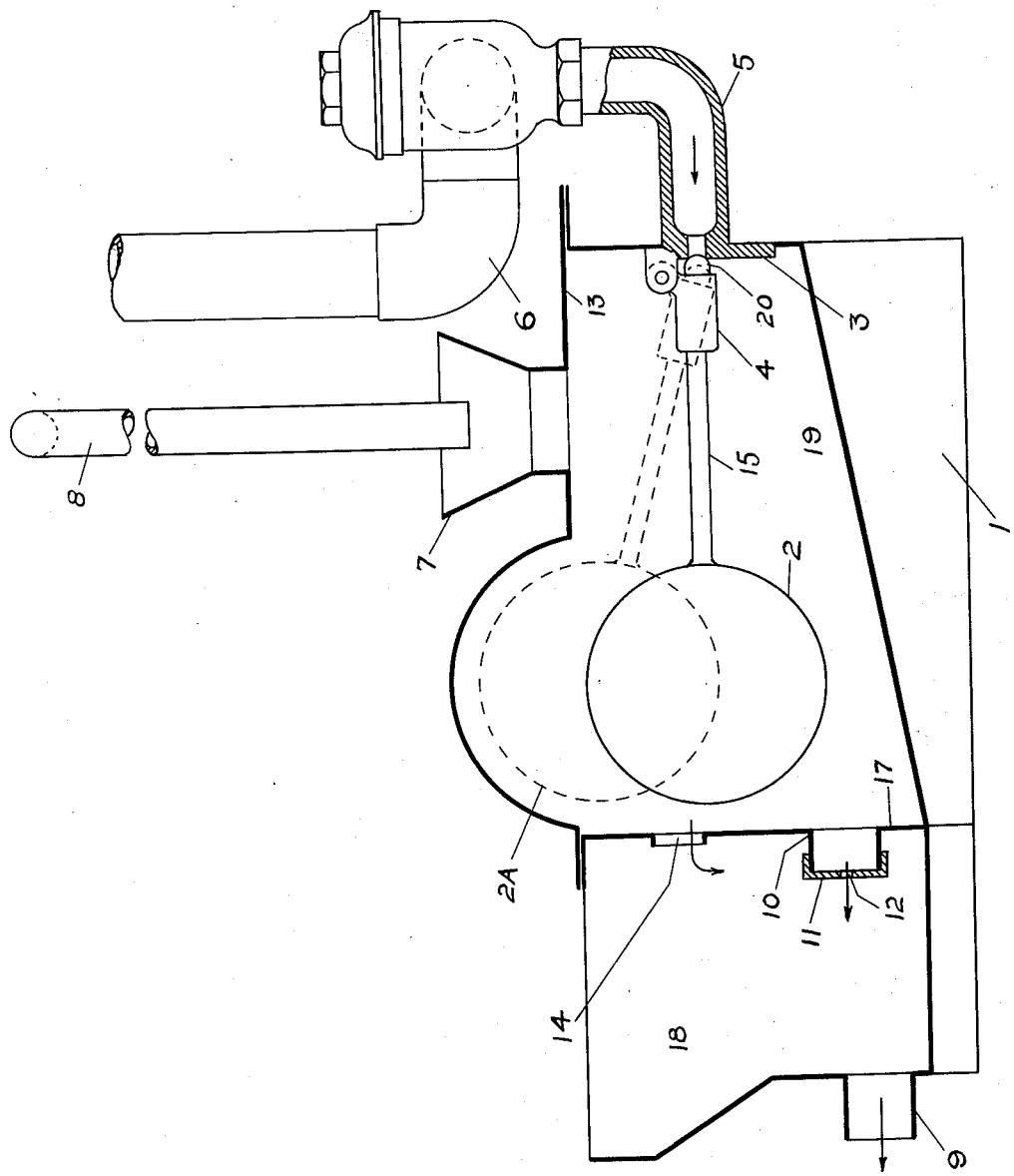
INVENTOR.
William Edward Booth.
BY
ATTORNEY Patented Mar. 19, 1940

2,194,351

UNITED STATES PATENT OFFICE

2,194,351

SAFETY DEVICE FOR DISTILLATION APPARATUS AND THE LIKE

William Edward Booth, Runcorn, England, assignor to Imperial Chemical Industries Limited, a corporation of Great Britain Application March 4, 1937, Serial No. 129,073
In Great Britain March 5, 1936

2 Claims. (Cl. 137—103)

This invention relates to safety devices which operate on the failure of a current of a liquid. Many types of apparatus are known which involve a current of liquid and in which damage or danger can result from the failure or partial failure of this current. For instance, the apparatuses in which volatile liquids are vaporised by heating, e. g., by steam in one part, to be condensed on water cooled surfaces in another part, and in some cases it is necessary that the apparatus should be in direct communication with the atmosphere. Examples of such open apparatus are to be found in the plants used for degreasing metal and like goods by the vapors of a volatile grease solvent. A typical degreasing plant comprises an open topped tank in the lower portion of which, solvent is vaporised by steam coils, and having cooling surfaces arranged around the walls of the upper portion to determine the upper limit of the vapor zone. In such apparatus a complete or even a partial failure of the water supply to the cooling surfaces may result in the escape of vapor into the surrounding atmosphere.

In British specification 337,770 it has been proposed to interconnect heating means and upper cooling means of degreasing apparatus so that heat is no longer applied when cooling of the upper part of the vessel ceases. It has also been proposed in such apparatus to provide thermostatic devices which come into operation to cut off the supply of heat when the solvent vapors rise above their normal level due to failure of the cooling water. In some cases, more particularly in the case of steam heating, there is a lag between the failure of the water supply and the interruption of the heat supply and the devices are on that account not universally applicable.

It is an object of this invention to provide improved means whereby the supply of heat can be interrupted without a serious lag when the supply of cooling liquid to the condensing surfaces fails or becomes inadequate.

This invention has as an object to devise a method whereby failure or partial failure of a supply of liquid can be made to give an alarm or to operate mechanism which will prevent the damage or danger. (For instance, in the case of degreasing plant described above the object is to devise a method whereby the failure of the cooling water would operate to cut off the heat.) A further object is to devise apparatus to carry out this method. A further object is to devise a method whereby such an alarm can be given or such mechanism put into operation without delay. A further object is to provide such a device which can be easily adjusted. A further object is to provide a device which will be simple and reliable. Further objects will appear hereinafter.

These objects are accomplished by the following invention. In apparatus, in which it is desired to provide that a process should be stopped or an alarm given on the total or partial failure of a current of liquid, I provide a container thru which the current or part of it is caused to pass, in the container I provide a leak which is of such size that it permits the passage of the minimum amount of liquid which it is desired should pass thru the system, an overflow discharge so that the level of the liquid in the container never rises above a certain level, a float on the surface of the liquid in the container, adapted to stop the process or give the alarm when the water level in the container falls below the level of the overflow discharge.

Apparatus which derives the heat required for its operation by arranging for the condensation of steam passing thru suitably disposed pipes is normally provided with a steam trap permitting condensate to escape, while preventing the egress of live steam. Steam traps of this type function in such a manner that if escape of the condensate is prevented, the continued supply of steam to the pipes ceases.

Therefore in a preferred form of my invention applied to apparatus of this latter type the float actuated by the level of the effluent water in the container is adapted to close the water exit of the steam trap when the level of the water in the container falls. Water thereupon accumulates rapidly in the steam trap and cuts off the supply of steam from the pipes, so that further evaporation of the volatile liquid within the apparatus is prevented. When the supply of cooling water is restored the float in the container is raised, the accumulated condensate in the steam trap can escape and the supply of steam is automatically recommenced. There are, of course, many types of steam traps, and it will be apparent that for satisfactory operation in the manner above described, a trap should be fitted of such size and type that condensate is discharged practically continuously.

The invention is further illustrated but not limited with reference to the accompanying drawing representing diagrammatically the safety device applied to a steam heated solvent degreasing apparatus of known type. For the sake of clarity the degreasing apparatus is not included in the drawing.

In the drawing the container 1 has in its cover 13 a funnel 7 situated immediately below the delivery pipe 8 from the condensing coils of the degreaser. The interior of the container is divided into spaces 18 and 19 by partition 17 situated between the funnel 7 and the water outlet 9. The partition 17 has an overflow 14 in its upper part, and in its lower part leak 12 in a cap 11 fixed on a short tube 10. If desired, a series of caps may be provided with openings of differing sizes, and the size of the leak thus varied by fixing on varying caps. Other means, e. g. a faucet, may replace the cap 11 which permit the size of the leak to be altered. Connected with the pipe 6 by which steam escapes from the heating coils is a steam trap 5 of the expanding bellows type, adapted to deliver condensate to the space 19 thru a shaped opening in plate 3 fixed in the wall of the container 1, and this opening can be closed by a hemispherical lug 20 fixed on the arm 15 of a float 2, said arm being hinged at 4. When the float 2 is raised into the position represented at 2a the lug is out of engagement with the opening and water can escape. When the float sinks, the lug 20 closes the opening and prevents escape of condensate into the space 19 and thus to outlets 12, 14 and 9.

In operation a sufficient supply of water to the condensing coils of the degreaser is started and then steam is turned on to the heating coils. Water flows from the outlet of the condensing coils and fills the space 19 up to the overflow 14, the size of the leak 12 having been so chosen that when the space 19 is filled up to the level of the overflow 14 water escapes thru 12 at a rate not less than that at which water has to be supplied to the cooling coils to condense all the vapor generated in the degreaser. The water which does not escape thru the leak 12 overflows thru 14 into space 18, and is delivered to waste thru outlet 9 together with the water escaping at 12.

The float 2 is thus kept in its raised position 2a and condensate can escape thru the trap 5 into chamber 19 and thence to waste. If the supply of water to the condensing coils fails, or becomes too small, water will escape from space 19 thru 12 more rapidly than it enters, the level of water in the space 19 will fall, and the float 2 will fall. The lug 20 will thus be made to close the opening in plate 3 and prevent escape of condensate which thereupon collects in the steam pipe. When the pipe becomes filled with condensate it is of course impossible for steam to flow thereinto and consequently vaporisation of solvent is prevented. When the supply of water is restored the space 19 refills, float 2 is raised, condensate escapes from the steam trap and then heating of the solvent is recommenced.

In the above account it has been assumed that the volume of condensate is small compared with that coming from the cooling coils, and this will normally be the case. If, however, the volume of condensate is large compared with the volume of the cooling water the construction of the safety device may be modified so that it does not flow into the space 19. Alternatively the size of leak 12 must be adjusted so that water escapes thru it at a rate given by the sum of the rate at which water enters thru trap 5 and the minimum rate at which water must pass thru the cooling coils to condense all the vapor generated in the apparatus. If the water escapes at a less rate than this, the supply of water to the cooling coils may become insufficient before heat is cut off. In practice, however, this circumstance is not likely to arise since for safety sake the leak 12 will be made of such size that the float 2 actuates ball valve 4 before the supply of water has become insufficient to condense all the vapor generated in the apparatus.

The invention is applicable to apparatus fitted with various sources of heat. Thus in a gas heated apparatus the movement of the float may be made, by lever mechanism or other suitable means, to actuate a valve in the gas supply; and in electrically heated apparatus similar mechanism may actuate a switch in the heating circuit, either directly or thru a relay. The invention is, however, particularly useful in steamheated apparatus, where the lag which the safety means hitherto employed have introduced between the failure of the water supply and the interruption of the heat supply, has been especially marked. Applied to such apparatus in the manner described, the interruption of the heat supply is brought about directly failure of the water supply commences, so that the loss of vapor which has hitherto been experienced is avoided; moreover when the supply of cooling water is reestablished the supply of heat is automatically recommenced.

The invention is also applicable to other types of apparatus, for instance, the water heaters which are known as geysers where the heater can be badly damaged if the water supply is cut off. In this case it would be preferable to pass the water supply thru my safety device before it reaches the geyser. In many industrial processes it is necessary to keep up a supply of liquid at a constant head. This is generally done by keeping a tank filled by a ball-cock device, this merely results in preventing the tank from getting too full. By applying my invention in the form of a second float or by adapting the float of the ball-cock, I can arrange that any fall in the head will result in the process being stopped or in an alarm being given. It may happen that the fall is too slow in the constant head tank to give a sufficiently rapid warning, in which case it could be arranged that the tank has a small overflow which would stop the moment the level of the liquid in the tank fell. This overflow could be led to my safety device. This method of drawing off a part of the liquid and utilising the part in my safety device instead of the whole could, of course, be applied to any apparatus in which my safety device is used. It is only necessary to insure that when the whole liquid decreases in volume, the volume of the part drawn off decreases in volume at the same rate or faster.

Further the use of a float is not the only means which could be used to cause the fall in the level of liquid in the container to operate the alarm or cut off the heat supply. The whole container could be mounted on springs which are kept in compression by the weight of the container and the liquid therein. Should the level of liquid fall, this weight would become less and the springs would cause the container to rise. This movement could be made to cut off the heat supply. Further, should the liquid be a good conductor of electricity, e. g., mercury, the fall in level could be arranged to break an electric circuit.

My invention has important advantages over many types of apparatus previously known, for example, where the interruption of the heat supply is effected thru the action of thermostats situated above the normal vapor level, the supply of heat continues until the water supply has been inadequate or has failed for so long that the vapor level has risen above its normal position and thus there must be some escape of vapor. Further the supply of water must be re-established before heat can be reapplied, so that vapor cannot escape thru the premature vaporisation of the volatile liquid.

As many apparently widely different embodiments of this invention may be made without departing from the spirit and scope thereof, it is to be understood that I do not limit myself to the specific embodiments thereof except as defined in the appended claims.

I claim:

1. A control device of the character described, comprising a float chamber, an inlet for delivering liquid to said float chamber, means associated with said float chamber for maintaining a predetermined maximum level therein, an outlet for discharging liquid from said float chamber at a level below said predetermined maximum liquid level, said outlet being restricted as compared to said inlet, a float member adapted to float upon the liquid within said float chamber, and control means responsive to changes in the level of said float member.

2. A control device of the character described, comprising a float chamber, an inlet for delivering liquid to said float chamber, an overflow outlet for maintaining a predetermined maximum liquid level in said float chamber, a second outlet for discharging liquid from said float chamber at a level below said predetermined maximum liquid level, said second outlet being restricted as compared to said inlet, a float member adapted to float upon the liquid within said float chamber, and control means responsive to changes in the level of said float member.

WILLIAM EDWARD BOOTH.